United States Patent [19]
Christian

[11] Patent Number: 5,161,519
[45] Date of Patent: Nov. 10, 1992

[54] MODULAR PANEL AS AIR TRANSFERRING CONDUIT

[76] Inventor: William D. Christian, P.O. Box 338, Moncure, N.C. 27559

[21] Appl. No.: 653,889

[22] Filed: Feb. 11, 1991

Related U.S. Application Data

[63] Continuation-in-part of Ser. No. 623,354, Dec. 7, 1990, Pat. No. 5,060,432.

[51] Int. Cl.⁵ .............................................. E04D 13/18
[52] U.S. Cl. ..................................... 126/429; 126/431; 126/DIG. 2; 52/233; 52/656; 52/284
[58] Field of Search ............... 126/429, 431, 432, 417, 126/450, 428, 449, 448, DIG. 2; 52/233, 656, 284, 312, 813, 478, 578

[56] References Cited

U.S. PATENT DOCUMENTS

| | | | |
|---|---|---|---|
| 4,054,246 | 10/1977 | Johnson | 126/431 |
| 4,327,708 | 5/1982 | Taylor | 126/431 |
| 4,379,449 | 4/1983 | Wiggins et al. | 126/431 |
| 4,480,633 | 11/1984 | Farrell | 126/DIG. 2 |
| 4,557,253 | 12/1985 | Talbert et al. | 126/DIG. 2 |

Primary Examiner—James C. Yeung
Attorney, Agent, or Firm—Olive & Olive

[57] ABSTRACT

A modular panel system for constructing buildings. Panels are made from column structures which form fit so that they slide together to create the panel. Panels are specially constructed so that they serve as air conduits, through which air, both to and from the living space of the modular panel home passes. Cool air is drawn from the living space into the panels of this invention, transferred to a solar panel air system where it is heated. The heated air is then transferred from the solar panel system into the panels of this invention and expelled into the living space.

6 Claims, 2 Drawing Sheets

MODULAR PANEL AS AIR TRANSFERRING CONDUIT

CROSS REFERENCE AND RELATED APPLICATION

This application is a continuation-in-part of patent application, Ser. No. 07/623,354 filed Dec. 7, 1990 U.S. Pat. No. 5,060,432.

BACKGROUND OF THE INVENTION

1. Field of the Invention

This invention relates to a modular panel system for constructing buildings. In particular, this invention relates to a modular panel system constructed from log halves which are cut to allow them to interconnect to be used as panels which may be used for transferring air through a home built from the modular panels.

2. Description of the Related Art

Buildings of today are generally heated by central heating systems. Central heating systems for homes which run on electricity or oil are expensive to operate and often inefficient. The present invention utilizes solar panels which take the energy rays from the sun (light rays and infra-red rays) to heat the air that will heat the modular panel home.

Use of liquid solar panel systems as a heating system is well known in the art. Typically, these solar panels are glass panels under which copper tubes are placed. With various heat absorbing and heat reflecting surfaces surrounding the copper tubes, water that is run through the copper tubes is heated by rays from the sun. The heated water either itself acts as the hot water source, or it indirectly creates a hot water source by being channelled through a heat exchanger which transfers the heat from the solar-panel heated water to the another water source.

The use of an air solar panel system in the present invention gains the advantages of solar heat but eliminates the use of water as the heat transferring medium which may create water leakage problems. Additionally, when using liquid solar panels to heat water in copper tubes, sufficient support must be provided underneath the solar heating system to bear its weight.

Air solar panel systems are also known in the art and are used to overcome the disadvantages of liquid solar panel systems. A solar panel air system typically has a duct system, through which air to be heated is transferred to the solar panel and dispersed from the solar panel to the living space. It also may include a storage system where hot air may be stored for later distribution into the living space. Air systems are advantageous because unlike liquid, air does not freeze, boil or cause corrosion in the ductwork. Additionally, air warmed in the air system can flow directly into the living space. The air collected in the solar panels can reach approximately 200 to 300 degrees Fahrenheit and therefore the solar air system provides a sufficient hot air source.

An air solar system may be used to heat a home built from the panels of the modular panel system. The modular panel system of this invention uses part of the house itself, the panels, to transfer the air thus accomplishing several tasks. First, any heat loss occurring in the air transference is lost to the inside of the home and thus is utilized in heating the home. Second, because the panels themselves act as air conduits, the need for external ductwork is lessened, thereby reducing the overall cost of construction.

It is therefore an object of this invention to provide a modular panel system for constructing a home whose panels are adaptable for use in transferring air throughout the home.

It is also an object of this invention to provide a modular panel system which is both relatively inexpensive to construct and operate.

It is a further object of this invention to create air transferring panels for the modular panel home which eliminates the need for a conventional central electric or oil heating system, by utilizing a solar panel air system.

Other objects and advantages will be more fully apparent from the following disclosure and appended claims.

SUMMARY OF THE INVENTION

This invention relates to and herein incorporates by reference the application entitled "Modular Wall and Floor Panels," (Ser. No. 07/623,354). The previous invention discloses a modular panel system having panels constructed of columns which are to be used for wall or floor panels. The present invention modifies the panels of the previous invention somewhat to create air transferring panels which act as air conduits.

The panels are constructed from columns which are cut so that they slip together to create a panel. The columns may be constructed from a variety of materials, for example, wood, foam core plywood, reinforced molded foam, or molded and reinforced VERMICULITE(TM). Preferably they are constructed from log halves and have a width of about six (6) inches and a height of about two (2) to two and one-half (2½) inches depending on the version of column being constructed. The logs may be sized by turning the limber in a turning lathe or other appropriate equipment until a diameter of approximately six (6) inches is reached. It may also be possible to use as columns log cores which remain after the wood used for making veneer is removed from the log. A particular advantage to using logs is that heated air which passes over wooden logs will not experience much heat loss since wood is a poor heat conductor.

The two primary versions of columns as described in the previous patent application (Ser. No. 07/623,354) are appropriate for this invention as well. The columns are constructed so that they slip together to create a panel. This form fit is accomplished through the use of a protrusion and a receptacle being cut from two opposite sides of each of the columns, and from at least one side of the external column as the columns are arranged in the panel. As a result each column has a third and fourth side with corresponding protrusions and receptacles. There is a flat first side, being formed by initially cutting the column into two halves, and a second side opposite to the first side. This second side remains rounded and corresponds to the rounded outer surface of the column.

After the columns are fit together, as described above, they may be secured together with liquid nails, or other wood seal. For the present invention, approximately eight (8) or nine (9) columns will be joined to create a wall panel, four (4) feet in width. The particular species of tree timber used to construct the columns may determine the number of columns necessary to obtain a four (4) foot wide panel. Preferably columns having a length of eight (8) feet will be used to create panels also having a length of eight (8) feet.

The panels may serve as wall panels. For purposes of this invention interior wall panels are constructed and may be used in conjunction with the exterior wall panels described in the previous invention. The interior wall panels may be used with or without the added x-frame of the previous invention which is used on exterior wall panels. The x-frame is comprised of several beams which are attached to the flattened surface of the wall panel. The beams line the perimeter of the panel and also span across the width of the panel center. Additionally beams traverse the wall pane, joining opposite corners, thus creating the "x" across the wall panel. The beams are attached to the wall panel by any conventional means, for example, nails, liquid nails, staples, corrugated clips or a combination thereof. The x-frame will generally be placed on the wall panels at the time of assembly. At that time the columns and x-frame may be glued and clamped together until set. If the modular panel home will be located in an especially cold climate, an x-frame for the interior wall may be desired so that a double thickness of insulation may be obtained.

Whether or not the interior wall panel contains an x-frame, the inside face of the wall panel which is created by the first flat side of the columns is placed toward the exterior wall panel, and the ribbed face toward the interior of the home. Wall covering which is well known in the art, such as sheet rock or other appropriate paneling, is placed upon the ribbed face of the interior wall panel, thereby creating openings or channels. A channel is the triangular space existing between adjacent columns and the wall covering. These channels extend the length of the wall panel and through them air passes into the living space of the modular panel home. Although all wall panels with wall covering will have channels because of their construction, not all wall panels will act as air transferring panels. Air transferring wall panels are spaced around the perimeter of the modular panel home in a manner which ensures even and effective air distribution into the home. While the panels may be used to transfer air for both heating and cooling the home, the discussion of this invention relates to solar panel heated air transferred through the panels to heat the modular panel home.

Panels may also serve as roof panels, constructed of approximately eight (8) or nine (9) columns each approximately six (6) inches wide. If longer than eight (8) foot roof panels are required, two panels may be joined to span the length of the roof rake.

The roof panel is placed with its flattened side upward and the ribbed surface down on the roof sheathing of conventional roof truss construction. The triangular shaped channels are created by the columns of the panel and the roof sheathing. Air which is utilized in the heating system passes through these channels.

An air transferring panel may contain an air intake duct or an air outlet. The intake duct spans the entire width of a panel and is placed into a corresponding space which has been cut-out from the covering. The duct thereby engages each channel in the panel. A forced air supply is introduced into the intake duct at a first end of the panel, transferred through the panel to a second end, and ultimately into the solar panel air system to be heated. Heated air to be distributed to the living space of the modular pane home is taken from the solar air system, transferred to a first end of a second panel through the channels of the second panel to its second end, and expelled through an air outlet. The air outlet spans the entire width of the panel and is inserted into a corresponding space in the wall covering, thereby engaging all the channels of the panel.

Although specific dimensions and proportions have been described, it should be appreciated that these dimensions and proportions may vary.

Other aspects and features of the invention will be more fully apparent from the following disclosure and appended claims.

CROSS REFERENCE AND RELATED APPLICATION

This application is a continuation-in-part of patent application, Ser. No. 07/623,354 filed Dec. 7, 1990.

DETAILED DESCRIPTION OF THE INVENTION AND PREFERRED EMBODIMENTS THEREOF

A modular panel system comprising:
(a) panels, each panel being fastenable to other panels and to a roofing assembly;
wherein each of the panels comprises a plurality of columns, each of the columns comprising:
  (i) a flat first side;
  (ii) a rounded second side opposite the first side;
  (iii) a third side, a portion of which third side is perpendicular to the first side, the third side having a receptacle adjacent the first side and a protrusion adjacent the second side; and
  (iv) a fourth side, a portion of which fourth side is perpendicular to the first side, the fourth side having a protrusion adjacent the first side and a receptacle adjacent the second side; wherein the third and fourth sides of two adjacent columns may be fit together by insertion of the protrusion on the third side of a first column into the receptacle on the fourth side of a second column, and insertion of the protrusion on the fourth side of the second column into the receptacle on the third side of the first column, and wherein a plurality of adjacent columns may be joined together by the protrusions and receptacles to form sets of columns;
and wherein each of the panels comprises:
  (i) a flat face formed by the first side of each column of a first set of columns, and
  (ii) a ribbed face formed by the second side of each column of the first set of columns;
(b) a covering piece placed on the panels, wherein the channels for transferring air are formed between the covering and some of the panels;
(c) a means for admitting forced air into the channels at a first end of a first panel through the channels to a second end of the first panel and into an air heating source;

(d) a means for transferring air from the heating source into the channels at a first end of a second panel and through the channels to a second end of the second panel; and (e) a means for expelling air from the channels of the second panel into an area outside the panel.

Figure 3:
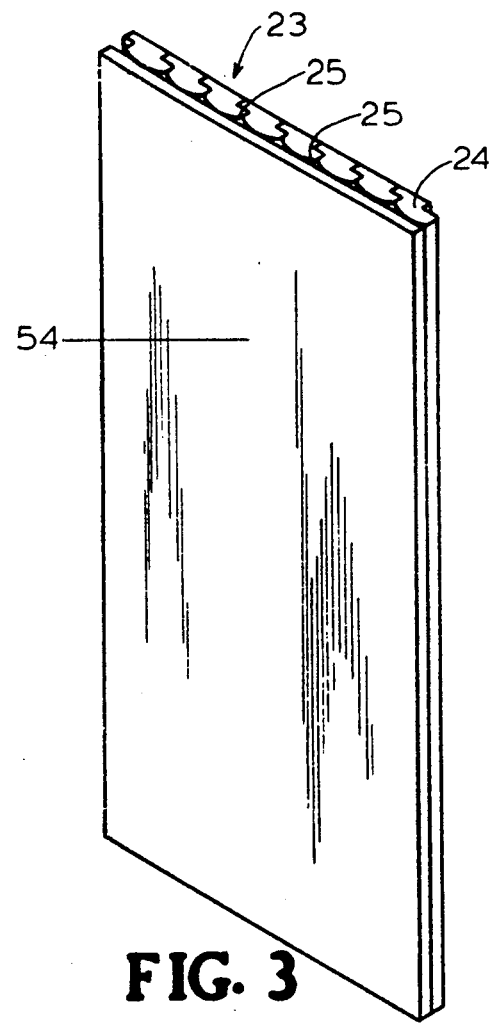
FIG. 3 is a perspective view of the panel of FIG. 2 with a covering attached.
Figure 4:
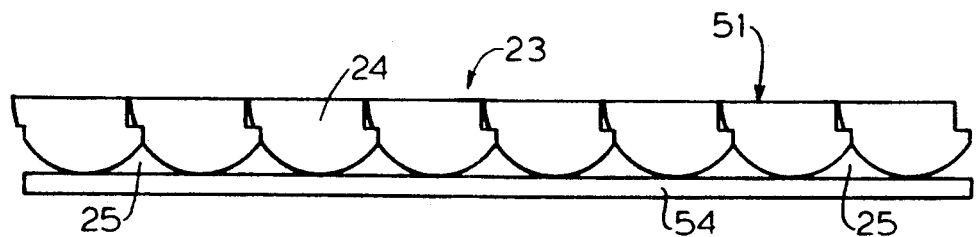
FIG. 4 is a line drawing showing the outline of a cross-sectional view of the panel of FIG. 3.
Figure 5:
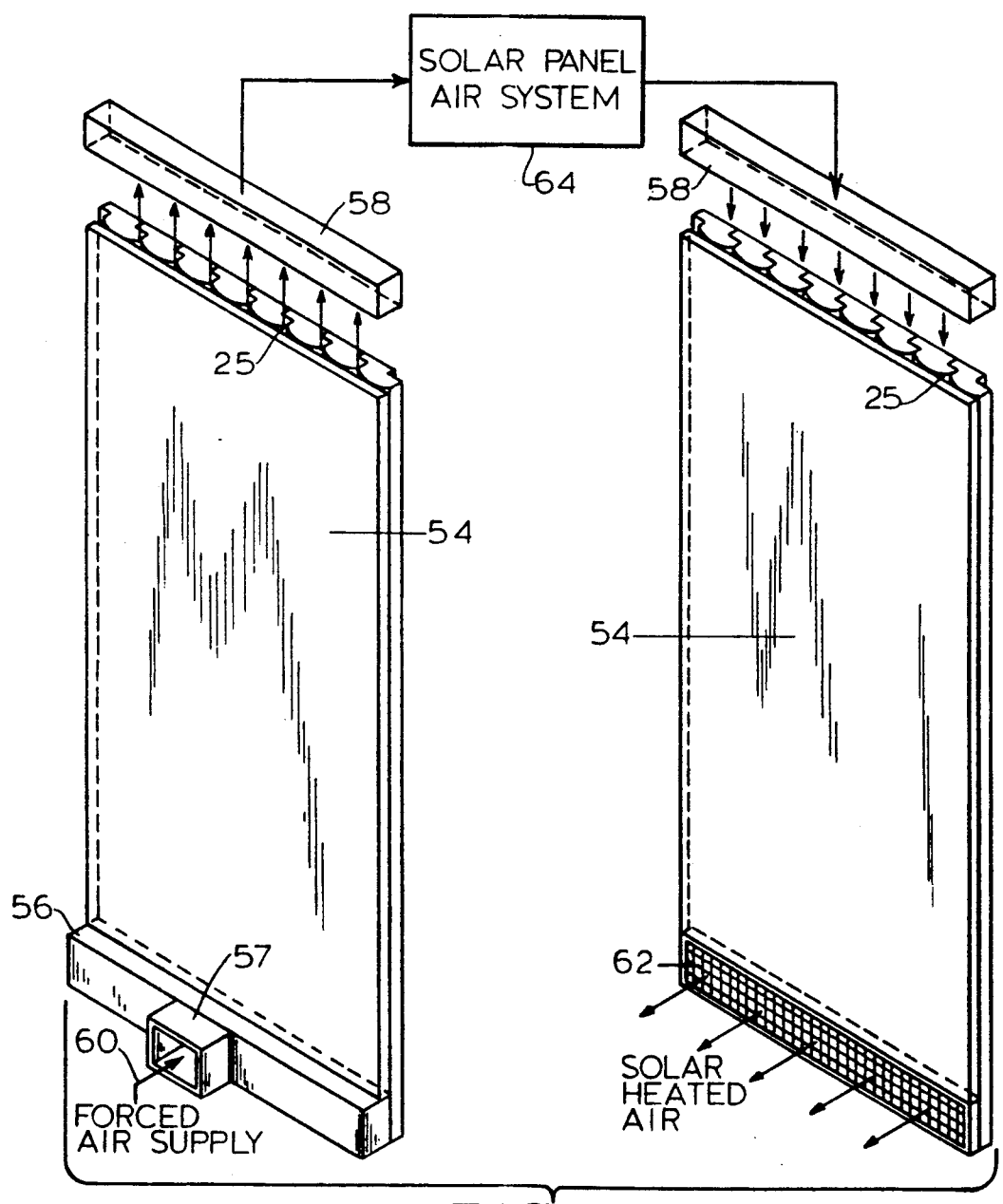
FIG. 5 is a flow diagram showing the pattern of air flow through panels.

The present invention discloses panels which act as air transferring conduits to aid in air circulation and distribution in a modular panel system home shown generally in FIGS. 3, 4 and 5. Although air used to both cool and heat the modular panel home may be transferred through the panels, discussion will be limited to the use of the panels in conjunction with solar heated air which will be distributed through the panels and into the living space of the modular panel home. Although discussed in the parent patent application, for purposes of clarification, the construction of the columns which comprise the panels will be discussed.

Figure 1:
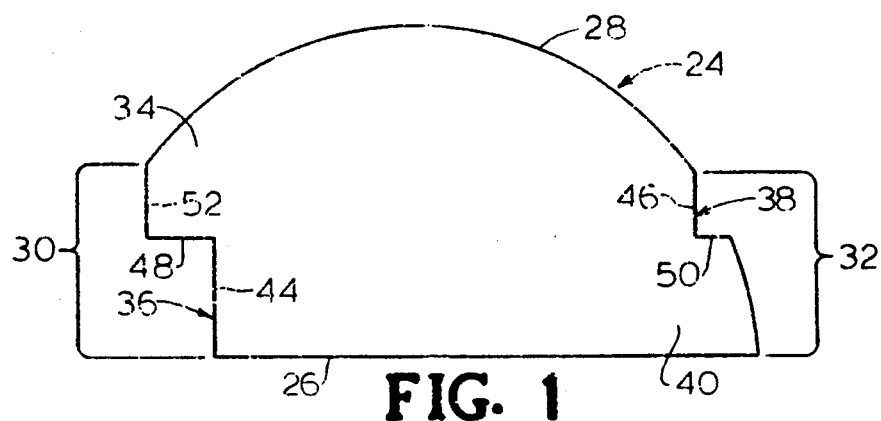
FIG. 1 is a line-drawing showing the outline of a cross-sectional view of a column of the invention.

Each column, shown in outline form in FIG. 1, may be formed according to the various embodiments discussed below using a method of wood forming and cutting known in the art. Preferably, one-site operation may be used in which a raw log is debarked, placed on a sawmill log carriage and sized to the appropriate width and height Subsequently the log will be split lengthwise into two pieces which are appropriate size for the log planer or molder. The molding or planing machine is used to machine the split log so that its cross sectional form is according to the column embodiment being made. For example, a Model A 20 (manufactured by Yates-American Machine Co., Beloit, Wis.) may be used to machine the column.

Figure 2:
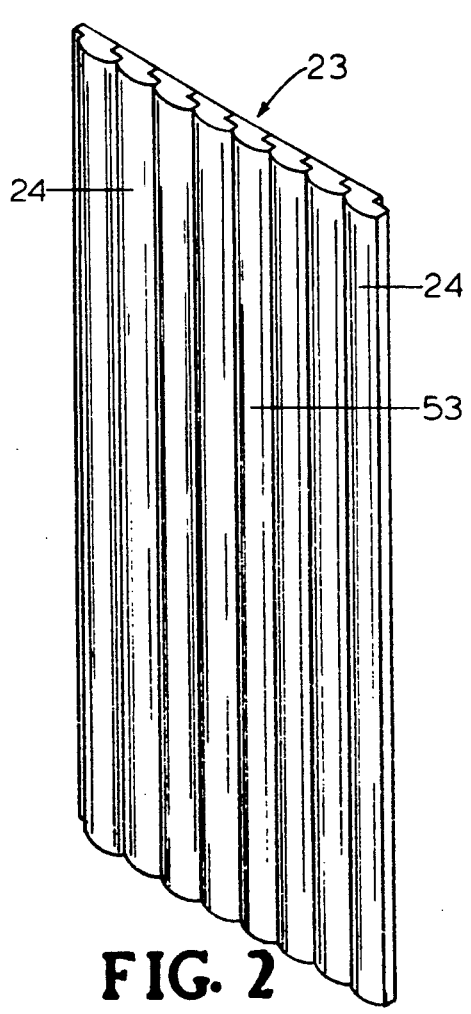
FIG. 2 is a perspective view of a modular panel constructed from the columns of FIG. 1.

Column 24 may be configured in at least two versions or embodiments, however, for purposes of this invention only one version will be described, namely column 24, shown in FIG. 1. Column 24 has a first flat inner surface 26, a second side 28 opposite said first side 26 and used for the outer surface of a panel, and a third side 30 and a fourth side 32, which are oppositely disposed from each other on column 24 and perpendicular to the flat inner surface 26. Third side 30 contains upper protrusion 34 and lower receptacle 36. Fourth side 32 contains upper receptacle 38 and lower protrusion 40. These two sides are shaped so that third side 30 and fourth side 32 fit together when two columns 24 are aligned adjacent to each other as shown in FIGS. 2, 3 and 4. For purposes of this description, a preferred arrangement of the protrusions and receptacles of the sides will be discussed; however, it is possible to vary somewhat the shape of the protrusion and the corresponding receptacle.

Column 24 has as its second side 28 a rounded outer surface maintaining the rounded surface of the column as molded or planed. In each column, receptacles 36 and 38 are made by cutting out a section from the columns by making a vertical cut, perpendicular to inner surface 26, to form edge 44 of receptacle 36 adjacent inner surface 26 and edge 46 of receptacle 38 adjacent second side 28. A horizontal second cut is made which is parallel to inner surface 26, forming parallel edge 48 of receptacle 36, and parallel edge 50 of receptacle 38. Upper cut 52 which is perpendicular to inner surface 26 and parallel to edge 46 is also made. When the cuts are made and those portions between and outside the cuts removed, protrusions 34 and 40 remain on the sides 30 and 32, respectively.

Columns 24 are joined by sliding together two adjacent columns 24, shown in FIGS. 2 and 4. Specifically, upper protrusion 34 of a first column 24 fits into upper receptacle 38 of an adjacent second column 24. Lower protrusion 40 of the second column 24 fits into lower receptacle 36 of the adjacent first column 24. Columns 24 slide easily together because receptacles 36 and 38 generally are the inverse shapes of protrusions 34 and 40, with the exception that in the preferred embodiment, protrusion 40 is not squared off but retains a rounded exterior surface. Upon joining columns 24, upper cut 52 and parallel edge 48 of one column 24 meets with perpendicular edge 46 and parallel edge 50 of the adjacent column 24. Columns 24 may be secured together with any conventional means; however liquid nails is a preferred method because of the convenience and appearance of liquid nails.

For purposes of this invention the panels may be used as wall and roof panels. They will be referred to as panel 23 shown in FIGS. 2, 3, and 4. Panel 23 is constructed from a plurality of adjoined columns 24, preferably eight (8) columns, each six (6) inches in width, to create a panel with the approximate dimensions of four (4) feet by eight (8) feet, although it could be constructed to a different size. The number of columns 24 utilized to achieve a width of four (4) feet may depend on the species of tree timber used.

Each panel 23 has inside face 51 and ribbed surface 53. Inside face 51 corresponds to flat inner surface 26 of columns 24. Ribbed surface 53 corresponds to second side 28 of columns 24. Ribbed surface 53 faces the interior of the home. Subsequently covering 54 is placed over ribbed surface 53, thereby creating channels 25 shown in FIGS. 3 and 4. Channels 25 are formed by the generally triangular openings which extend the length of columns 24; two sides being created by the curved edges of adjacent columns 24 and the third side by the surface of covering 54. With a panel constructed of eight (8) six-inch (6") columns 24, seven (7) channels 25 are present in each panel 23, an eighth channel being created when two panels 23 are joined. On panels 23 which act as interior wall panels, preferably covering 54 is sheet rock which maximizes air flow through channels 25 and minimizes heat loss as the heated air passes through channels 25. On panels 23 which act as roof panels any conventional roof sheathing may act as covering 54.

X-frame 21 of the previous invention (not shown) may also be placed on inside face 51 of panel 23 which serves as an interior wall panel to obtain a space to place a additional layer of insulation for modular panel system homes. However, for moderate climates, panel 23 may be used without the added x-frame 21, and the homeowner may rely on the insulation which is placed into the x-frame of the exterior wall panels.

Not every interior wall panel will act as an air transferring panel 23; only several interior wall panels will act as air transferring panels 23. The exact placement of air transferring panels 23 around the perimeter of the modular panel home will depend on the floor plan of the home. Of course the desired objective is to obtain even distribution of heated or cooled air into the rooms of the modular panel home with exterior walls.

Panels 23 serving as interior wall panels are placed vertically upon floor panels or other flooring and line the perimeter of the modular panel home. Panels 2 attach to the frame and floor construction of a home in the usual and conventional manner. On top of interior wall panels 23 sit assembly caps 55 (not shown), which are known in the relevant art. For those interior wall panels 23 which are not air transferring panels the assembly caps 55 are no different than those known in the art, except that they may be slightly higher and wider. Assembly caps 55 of this invention are preferably constructed from studs which measure approximately two (2) inches by six (6) inches so that assembly caps 55 extend across the full depth of panel 23 and covering 54.

Panels 23 for the roof may also be used upon a conventional roof truss and may act as an air transferring panel. If one eight-foot panel 23 is not sufficient length to extend the length of the roof rake, several panels 23 may be joined, end-to-end, to acquire the needed length. Ribbed surface 53 is placed on the roof sheathing which acts as covering 54. The roof sheathing is attached to conventional roof truss construction. Channels 25 are created between columns 24 of panel 23 and covering 54.

Located upon panel 23 is collecting box 58, shown in FIG. 5, which encloses an area above the openings of channels 25. The bottom face of collecting box 58 may be open or may contain an opening so as not to restrict air flow from channels 25 into collecting box 58. The top face of the collecting box 58 may contain one or several openings to permit air to flow between collecting box 58 and solar panel system 64.

Intake duct 56, shown in FIG. 5, is placed at a first end of panel 23, opposite collecting box 58 at a second end of panel 23. Intake duct 56 is placed into covering 54 which has a space of corresponding dimensions in length and width to intake duct 56. Intake duct 56 spans the entire width of panel 23 thereby engaging each channel 25 of panel 23. It has two oppositely disposed edges which span panel 23 lengthwise; one closer than the other to the first end of panel 23. Intake duct 56 may be constructed at one edge to allow free air flow into channels 25 from intake duct 56. At its opposite edge, closer to first end of panel 23, intake duct 56 may be constructed to abut ribbed surface 53 so that air flows into channels 25 and through to the second end of panel 23. Intake duct 56 may also contain entrance 57 into which forced air supply 60 may enter intake duct 56. Forced air supply 60 is located outside panel 23. The air enters into intake duct 56 through entrance 57 and flows through channels 25 along the length of panel 23 into collection box 58.

From collecting box 58, the air flows to solar panel system 64 where the air is heated through the use of solar energy. Subsequently, air to be circulated back into the living space is transferred into collecting box 58 located at a first end of a second panel 23. From collecting box 58 air flows through channels 25 and into air outlet 62 at a second end opposite of first end of second panel 23. Air outlet 62 preferably extends the full width of panel 23 thereby engaging all channels 25. Air outlet 62 is inserted into covering 54 which contains an opening of corresponding dimensions in length and width to air outlet 62. Air outlet 62 has two oppositely disposed edges; one closer than the other to second end of second panel 23. Air outlet 62 may be constructed at one edge to allow free flow of air from channels 25 into air outlet 62. At its opposite edge, closer to the second end of panel 23, air outlet 62 is constructed to abut ribbed surface 53 thereby directing air out into the living space and not further into second end of second panel 23.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A modular panel system comprising:
   (a) panels, each panel being fastenable to other panels and to a roofing assembly;
   wherein each of the panels comprises a plurality of columns, each of the columns comprising:
   (i) a flat first side;
   (ii) a rounded second side opposite the first side;
   (iii) a third side, a portion of which third side is perpendicular to the first side, the third side having a receptacle adjacent the first side and a protrusion adjacent the second side; and
   (iv) a fourth side, a portion of which fourth side is perpendicular to the first side, the fourth side having a protrusion adjacent the first side and a receptacle adjacent the second side; wherein the third and fourth sides of two adjacent columns may be fit together by insertion of the protrusion on the third side of a first column into the receptacle on the fourth side of a second column, and insertion of the protrusion on the fourth side of the second column into the receptacle on the third side of the first column, and wherein a plurality of adjacent columns may be joined together by the protrusions and receptacles to form sets of columns;
   and wherein each of the panels comprises:
   (i) a flat face formed by the first side of each column of a first set of columns, and
   (ii) a ribbed face formed by the second side of each column of the first set of columns;
   (b) a covering piece placed on the panels, wherein the covering piece and some of the panels form channels for transferring air;
   (c) a means for admitting forced air into the channels at a first end of a first panel through the channels to a second end of the first panel and into an air heating source;
   (d) a means for transferring air from the heating source into the channels at a first end of a second panel and through the channels to a second end of the second panel; and
   (e) a means for expelling air from the channels of the second panel into an area outside the panel.

2. The modular panel system according to claim 1, wherein the heating source is a solar panel air system.

3. The modular panel system according to claim 1, further comprising a collecting box mountable to the second end of the first panel or the first end of the second panel wherein air collects after being emitted from the channels of the first panel or before being transferred into the channels of the second panel.

4. The modular panel system according to claim 3 wherein the collecting box has a first surface which abuts the first or second panel, the first surface engaging all the channels, and a second surface which contains at least one opening connectable to the solar panel air system and which allows air flow from the channels to the solar panel air system.

5. The modular panel system according to claim 1, wherein the means for admitting air into the first panel is an intake duct mountable on the panel and insertable into the covering, through an opening therein corresponding to the perimeter dimensions of the intake duct, and the intake duct extending the full width of the panel and engaging the channels.

6. The modular panel system according to claim 1, wherein the means for expelling air from the second panel is a air outlet mountable on the panel and insertable into the covering through an opening therein, corresponding to the perimeter dimensions of the air outlet, the outlet extending the full width of the panel and containing an opening through which the air from the panels may be expelled.

* * * * *